Figure 1:
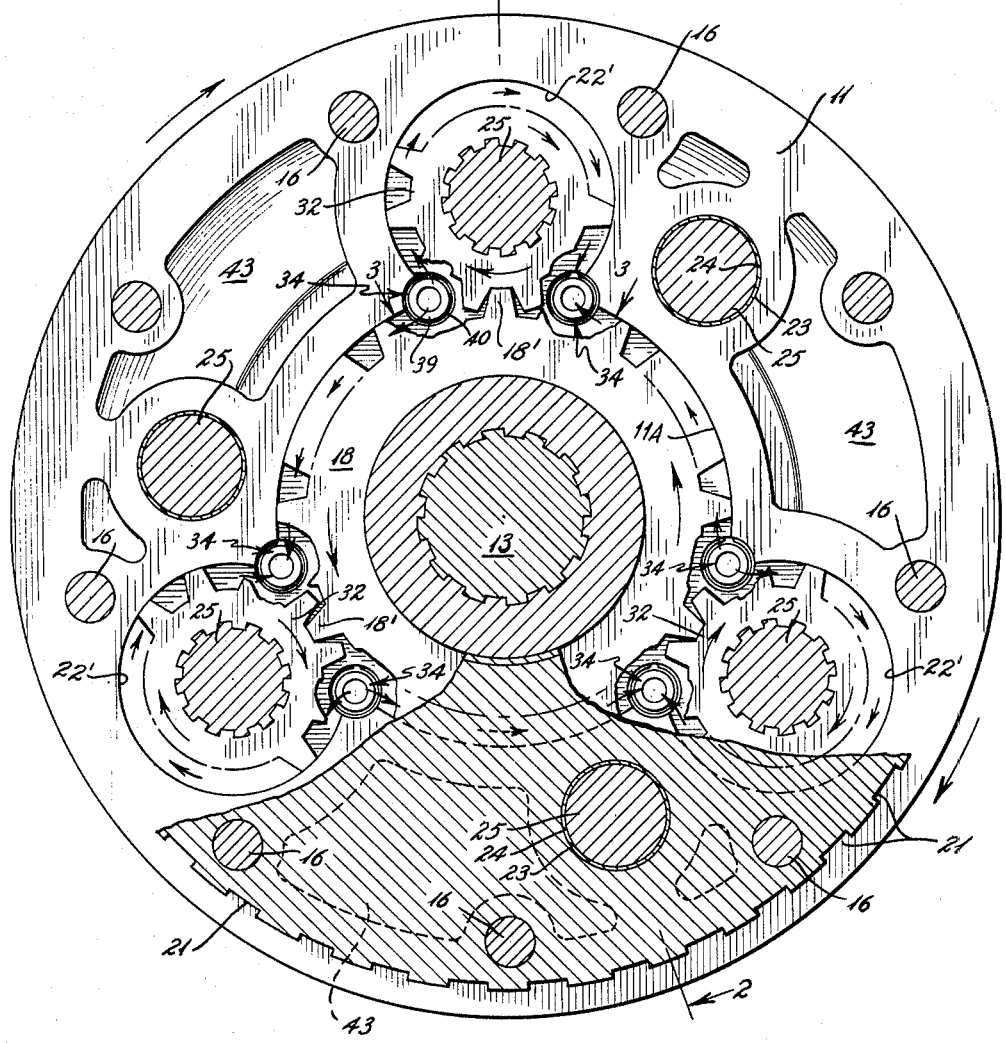

May 17, 1966  C. H. NICKELL  3,251,244
TORQUE DIVIDED HYDRAULICALLY PROPORTIONED OUTPUT DIFFERENTIAL
Filed Feb. 2, 1962  3 Sheets-Sheet 1

INVENTOR
CLAUDE H. NICKELL

BY
ATTORNEY

May 17, 1966 C. H. NICKELL 3,251,244
TORQUE DIVIDED HYDRAULICALLY PROPORTIONED OUTPUT DIFFERENTIAL
Filed Feb. 2, 1962 3 Sheets-Sheet 2
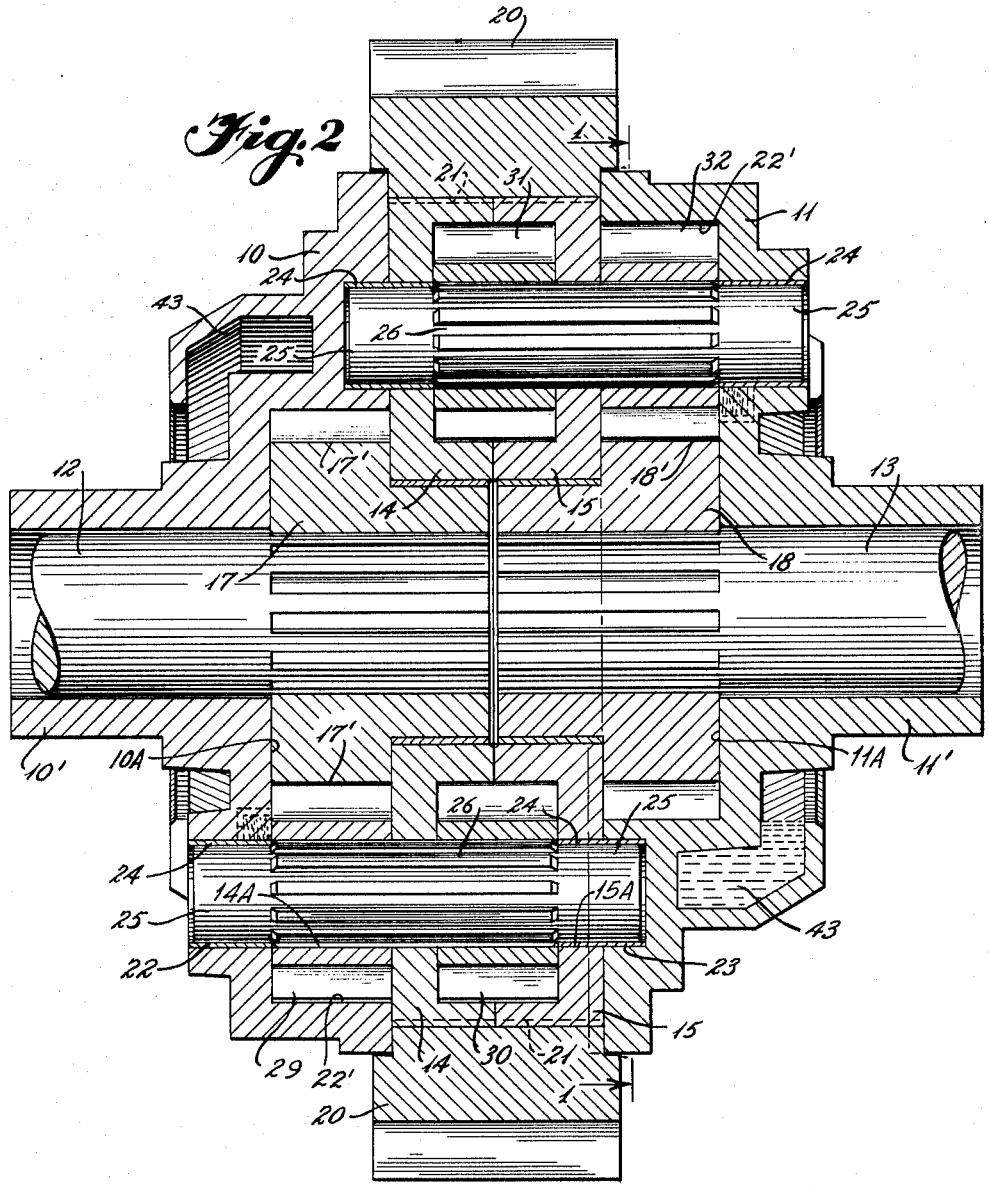
INVENTOR
CLAUDE H. NICKELL
BY
ATTORNEY

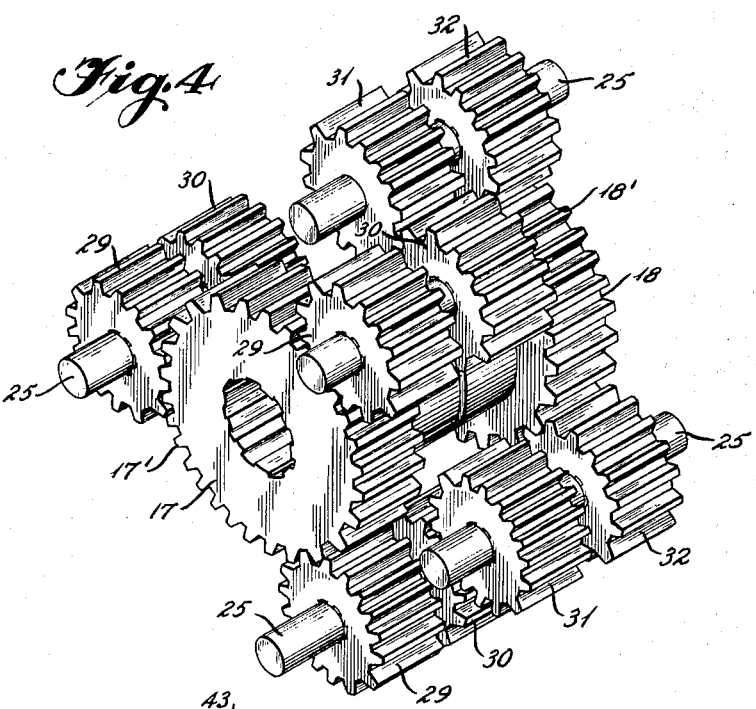
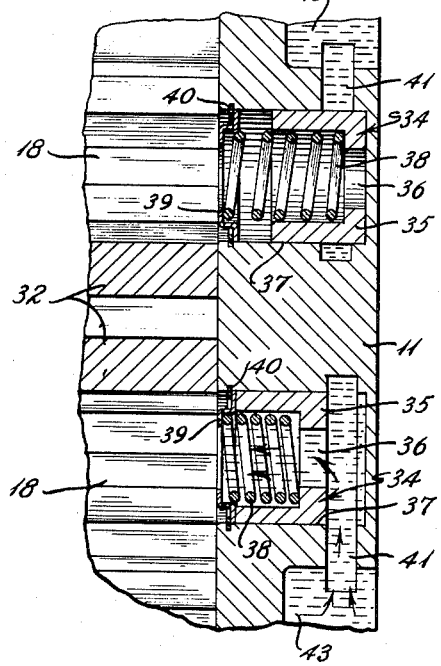

United States Patent Office 3,251,244
Patented May 17, 1966

3,251,244
TORQUE DIVIDED HYDRAULICALLY PROPORTIONED OUTPUT DIFFERENTIAL
Claude H. Nickell, 17809 Oakwood Blvd.,
Dearborn, Mich.
Filed Feb. 2, 1962, Ser. No. 170,740
5 Claims. (Cl. 74—711)

This invention relates to devices used in the transmission of power from a driving member to two or more driven members, and to means automatically for transferring such power to selected driven members when required.

The invention relates particularly to a differential for a vehicle having a source of motive power for transmitting torque to two or more output shafts and driven members, and to automatic means for transferring such torque to selected driven members when other driven members lose traction and provide no driving force.

Heretofore various mechanisms have been constructed transmitting driving torque from a driving source to a plurality of driven members including manually controlled external oil pumps, clutch means, manual control means, and the like. However these prior devices had to be manually controlled, have been complicated, bulky, unreliable, and otherwise have proven unsatisfactory.

It is an object of the invention to provide an hydraulically proportioned output differential having a divided torque whereby hydraulic fluid can be automatically introduced into the differential to create a partial fluid lock and transmit a driving torque to a selected driven member.

Another object of the invention is to provide a differential having a mechanical gear train drive and automatically operated hydraulic means for creating a fluid lock to prevent the free rotation of one member of such mechanical gear train.

A further object of the invention is to provide an hydraulically proportioned output differential having a mechanical gear train drive and a series of spring loaded directional flow control valve assemblies for automatically introducing hydraulic fluid into the area of the mechanical gear train drive to create a partial fluid lock and thereby transmit a driving torque to a selected driven member.

Other objects and advantages of the invention will be apparent from the following description taken in conjunction with the accompanying drawings wherein:

FIG. 1 is a vertical section taken along the line 1—1 of FIG. 2;

FIG. 2, a section taken along the line 2—2 of FIG. 1;

FIG. 3, an enlarged fragmentary section along the line 3—3 of FIG. 1; and

FIG. 4, a schematic perspective of the mechanical gear train drive.

Briefly stated, the present invention is a torque divided hydraulically proportioned output differential comprising a pair of output shafts on which is rotatably mounted a differential casing and includes a pair of spur gears removably mounted on said output shafts and a plurality of pinion gears interconnected with such spur gears to form a mechanical gear train drive and a plurality of automatic spring loaded directional flow control valve assemblies in communication with a source of hydraulic fluid. The valve assemblies are adapted to automatically introduce hydraulic fluid into the area of the spur gears and cooperating pinion gears to create a partial fluid lock and thereby prevent free rotation of the mechanical gear train drive and to transmit the driving torque to a selected driven member.

With continued reference to the drawings, the present invention comprises a pair of differential casings 10 and 11 having hubs 10' and 11' rotatably supported by bearings not shown. A pair of opposed axles or output shafts 12 and 13 are floatably received within the hubs 10' and 11' of the casings 10 and 11 respectively. A pair of annular U-shaped gear housings 14 and 5 are located intermediate the casings 10 and 11 and such casings and housings are secured together by bolts or other fasteners 16. Spur gears 17 and 18 having teeth 17' and 18' are splined or other wise removably fixed to the inner ends of shafts 12 and 13 respectively and are adapted to transmit a driving torque to driven members (not shown) on the outer ends of such output shafts. The spur gears 17 and 18 are received within recesses 10A and 11A in the casings 10 and 11, respectively.

In order to form a mechanical gear train drive to transmit the driving torque, a driving member 20, as for example, a spur gear, bevel gear pulley, sprocket, ring gear, etc. is removably attached to the gear housings 14 and 15 in any desired manner as by splines 21. The casings 10 and 11 are substantially identical and each has a plurality of openings 22 located within recesses 22' which are in communication with recesses 10A and 11A and an equal number of counterbores 23 arranged in such a manner that when the casings are connected in opposed relation the openings 22 of one casing will cooperate and be in axial alignment with the counterbores 23 of the other casing. The gear housings 14 and 15 are provided with openings 14A and 15A, respectively, and such openings are in axial alignment with the openings 22 and counterbores 23. Each of the openings 22 and counterbores 23 is adapted to receive a bearing 24 and each pair of aligned bearings 24 rotatably receives a pin or auxiliary shaft 25 which extends through the openings 14A and 15A and has a splined central portion 26. The bearings 24 are constructed of a frictional material such as sintered bronze to resist the free rotation of such shafts while providing a bearing surface to resist wear on both the shaft and the bearing.

A pair of pinion gears 29 and 30 are removably secured to the pins 25 located in the openings 22 of the casing 10 and a second pair of pinion gears 31 and 32 are removably secured to the pins 25 located in the openings 22 of the casing 11. The pinion gears 29 are disposed within the recesses 22' of the casing 10 and mesh with the teeth 17' of the spur gear 17 while the pinion gears 30 mesh with cooperating pinion gears 31. The pinion gears 32 are disposed within the recesses 22' of the casing 11 and mesh with the teeth 18' of spur gear 18 to thereby connect the spur gears 17 and 18 through a mechanical gear train drive. This structure is conventional and when one of the driven members encounters a slippery surface and loses traction, substantially all of the torque will be transmitted to the member which is slipping. Since there is no reaction to the driven member, the spur gear on that side will increase its revolutions per minute and the non-slipping driven member will not receive sufficient torque to propel the vehicle.

In order to prevent free rotation of the spur gears and, consequently, any slipping driven member, and to transmit the majority of torque to the non-slipping driven member, hydraulic fluid is introduced into the area of the point of contact between the intermeshing spur and pinion gears, and means is provided for preventing the escape of such fluid. Since the fluid is substantially non-compressible, such fluid impinges on the gear teeth and resists the rotation thereof. This is accomplished by providing a pair of automatic spring loaded directional flow control valve assemlies 34 located on opposite sides of each pinion gear which engages the spur gears 17 and 18 substantially at the confluences of the recesses 22' with the recesses 10A and 11A.

As illustrated in FIG. 3, the valve assemblies each comprise a piston 35 of generally hollow cylindrical configuration having an opening 36 in its closed end wall. The piston 35 is mounted for reciprocation within a counterbore or opening 37. Such piston 35 is normally urged against the inner surface of the counterbore 37 by a spring 38 having one end received within the hollow piston and the opposite end mounted on a retaining bracket 39 held in position by a snap ring 40. Fluid is introduced into the counterbore 37 through an inlet port or radial groove 41 adjacent to the closed end of the counterbore 37.

The inlet port 41 is in communication with an oil storage well 43 which forms an annular groove about each of the differential casings 10 and 11. Fluid is introduced into such annular grooves in any conventional manner, as for instance, by the driving member 20 having its lower portion immersed in fluid carried within a differential housing (not shown) and, upon rotation of such driving member, the fluid will be thrown by centrifugal force against the inner surface of such differential housing where it will be collected by conventional ribs or troughs (not shown) and the fluid thus collected will run down such ribs or troughs and be discharged into the well or annular groove 43. When the vehicle is not moving, only the lowermost portion of the well will contain fluid since the fluid will drain out into the housing. However, upon rotation of differential casings and the driving member, fluid which is introduced into the wells on opposite ends of the casings will be retained within such wells by centrifugal force so that the wells will remain substantially filled at all times while the vehicle is in motion.

Each of the pinion gears, which engages a spur gear, is provided with a pair of valve assemblies so that when one of the driving members begins to slip, the spur gear of that member will rotate more rapidly than the driving member and differential casings and thereby create a suction to move one of the pistons 35, associated with the pinion gears, against the tension of the spring 38 and expose the opening 36 to the hydraulic fluid within the annular channel 42. The fluid which is thus introduced into the area of the teeth is free to fill the space between the disengaged teeth of the spur gear and the pinion gears until all of the space between such gears is filled. Since the fluid is trapped and cannot escape except through bleed down between inter-engaging parts, such fluid will resist the rotation of both the pinion gears and the spur gears.

It is noted that due to the bleed down rate and the amount of fluid which can escape through the pitch line of the engaged teeth, that a positive lock cannot be maintained. However, as long as the driven member which is slipping continues to rotate, the valve will remain open and permit a steady inflow of fluid to replenish fluid which is lost.

As soon as the slipping driven member again meets resistance and provides driving traction, the opposed spur gears will rotate at the same rate, at which time the tension of the spring 38 will close the valve assembly which is open and such opposed spur gears will be connected only by the mechanical gear train drive. The fluid pressure against the rotating teeth will be relieved by the fluid bleeding out between adjacent cooperating surfaces.

It will be apparent that the rotating spur gears will function as fluid pumps to assist the flow of fluid and that the direction of rotation of the driving and driven members will determine which valve members will open due to suction.

It will be obvious to one skilled in the art that various changes may be made in the invention without departing from the spirit and scope thereof and therefore the invention is not limited by that which is illustrated in the drawings and described in the specification, but only as indicated in the accompanying claims.

What is claimed is:

1. A differential comprising a pair of output shafts, a spur gear mounted on each of said shafts, a differential casing rotatably mounted on said output shafts, a plurality of pins rotatably mounted within said casing, a first series of pinion gears removably secured to said pins and meshing with said spur gears, a second series of pinion gears, certain of said second series of pinion gears being removably mounted on certain of said pins, certain other of said second series of pinion gears being removably mounted on certain other of said pins and meshing with said certain of said second series of pinion gears to form a mechanical gear train drive, pressure operated means for introducing hydraulic fluid selectively against said first series of pinion gears and said spur gears to create a partial lock, said pressure operated means including a series of automatic spring-loaded directional flow control valve asemblies, each valve assembly having a generally hollow cylindrical piston, spring means for urging said piston toward closed position, a retaining bracket for said spring, a source of hydraulic fluid, and fluid ports connecting said source of hydraulic fluid with said valve assemblies, whereby when one of said spur gears rotates more rapidly than the other of said spur gears the pressure wil be altered and certain of said valve assemblies will open to introduce hydraulic fluid against the rapidly rotating spur gear and associated pinion gears to create a partial fluid lock to resist the free rotation of the rapidly rotating spur gear and transmit driving torque to the other of said spur gears.

2. The structure of claim 1 in which said pins are mounted in frictional bearings to resist the free rotation of said pins.

3. Apparatus for transmitting torque from a driving member to a series of driven members comprising a pair of output shafts, a differential casing rotatably mounted on said output shafts, a driving member carried by said casing, a pair of opposed spur gears mounted on said output shafts within said casing, a series of auxiliary shafts in said casing, a first series of pinion gear removably mounted on certain of said auxiliary shafts and meshing with one of said spur gears, a second series of pinion gears removably mounted on other of said auxiliary shafts and meshing with the other spur gear, a third series of pinion gears mounted on said series of auxiliary shafts for interengagement between adjacent auxiliary shafts to form a mechanical gear train, pressure operated means automatically to cause hydraulic fluid to impinge upon said spur gears and meshing pinion gears, said pressure operated means including a source of hydraulic fluid, multiple spring-loaded directional flow control valve assemblies in communication with said source of hydraulic fluid whereby when one of said spur gears rotates more rapidly than the other spur gear the pressure will be altered and the valve assemblies associated with the rapidly rotating spur gear will open and cause hydraulic fluid to impinge upon the spur gear and cooperating pinion gears to create a partial lock to resist the free rotation of the rapidly rotating spur gear and to transmit torque to the other spur gear.

4. Apparatus for transmitting torque from a driving member to multiple driven members comprising a differential casing having a plurality of recesses rotatably carried by said driven members, a pair of opposed spur gears mounted on said driven members and located in certain of said recesses, multiple series of pinion gears, certain of said pinion gears being located in certain other recesses and meshing with said spur gears, certain other of aid pinion gears being connected to said certain pinion gears and meshing with each other to provide a gear train drive, pressure operated means automatically for introducing hydraulic fluid selectively into said recesses, and multiple spring-loaded control valve assemblies communicating with said recesses, whereby when one of said spur gears rotates more rapidly than the other spur gear the rapidly rotating spur gear will alter the pressure within the recesses and will open certain valve assemblies to introduce hydraulic fluid into contact with the rapidly rotating spur gear and cooperating pinion gears to create a partial lock to resist the free rotation of the rapidly rotating spur gear and to transmit torque to the other spur gear.

5. A differential for transmitting torque from a driving member to multiple driven members and from one driven member to another driven member comprising a pair of spaced output shafts located substantially in alignment, a spur gear mounted on each of the adjacent ends of said shafts in spaced relation with each other, a casing having a plurality of recesses rotatably mounted on said output shafts, a driving member fixed to said casing, a plurality of pins rotatably mounted in said casing, a first series of pinion gears located in certain of said recesses, said first series of pinion gears being mounted on certain of said pins and meshing with one of said spur gears, a second series of pinion gears mounted on said certain pins in spaced relation to aid first series of pinion gear, a third series of pinion gears mounted on certain other pins and meshing with said second series of pinion gears, a fourth series of pinion gears located in certain other recesses, said fourth series of pinion gears being mounted on said certain other pins in spaced relation to said third series of pinion gears and meshing with the other spur gear and forming a mechanical gear train, pressure operated means for introducing hydraulic fluid selectively into said recesses between said first series of pinion gears and said one spur gear or into said recesses between the the fourth series of pinion gears and said other spur gear when one of said spur gears is rotated more rapidly than the other, whereby a partial lock will be created on said rapidly rotative spur gear to transmit driving torque to the other spur gear.

References Cited by the Examiner

UNITED STATES PATENTS

| | | | |
|---|---|---|---|
| 1,229,548 | 6/1917 | Van Sant et al. | 74—711 |
| 2,978,929 | 4/1961 | Roberts | 74—711 |
| 3,049,943 | 8/1962 | Frentzel | 74—711 |

DON A. WAITE, *Primary Examiner.*

BROUGHTON G. DURHAM, *Examiner.*

K. DOOD, *Assistant Examiner.*